United States Patent
Ota et al.

[11] Patent Number: 6,073,507
[45] Date of Patent: Jun. 13, 2000

[54] SHIFT CONTROL UNIT OF ELECTRIC-POWER ASSIST TRANSMISSION

[75] Inventors: Atsuo Ota; Satoru Narita; Tatsuo Masuda, all of Saitama, Japan

[73] Assignee: Honda Giken Kogyo Kabushiki Kaisha, Tokyo, Japan

[21] Appl. No.: 09/151,664

[22] Filed: Sep. 11, 1998

[30] Foreign Application Priority Data

Sep. 13, 1997 [JP] Japan ................................. 9-268195

[51] Int. Cl.⁷ ................................................ F06H 61/38
[52] U.S. Cl. ........................ 74/335; 74/336 R; 477/906
[58] Field of Search ............................... 74/335, 336 R; 477/121, 906

[56] References Cited

U.S. PATENT DOCUMENTS

| | | | |
|---|---|---|---|
| 3,670,599 | 6/1972 | Nagamatsu | 477/129 X |
| 4,996,893 | 3/1991 | Nakamura et al. | 477/121 X |
| 5,362,286 | 11/1994 | Satoh et al. | 477/138 X |
| 5,591,102 | 1/1997 | White et al. | 74/335 X |
| 5,688,205 | 11/1997 | Buhler | 74/336 R X |
| 5,881,853 | 3/1999 | Peuster et al. | 74/335 X |

FOREIGN PATENT DOCUMENTS 539865  2/1993  Japan .

*Primary Examiner*—Khoi Q. Ta
*Attorney, Agent, or Firm*—Birch, Stewart, Kolasch & Birch, LLP

[57] ABSTRACT

A shift control unit is provided in an electric-power-assist transmission which offers good operatability. A shift disabling unit employs a neutral-position detecting unit, a vehicle-speed judging unit, an engine-rotational-speed judging device, an OR circuit and an AND circuit. The neutral-position detecting unit is used for outputting an "H"-level signal to indicate that a gear is placed at a neutral position. The vehicle-speed judging unit generates an "H"-level signal for a speed of a vehicle equal to or higher than 10 km/h. On the other hand, the engine-rotational-speed judging device generates an "H"-level signal for a rotational speed of an engine equal to or higher than 3,000 rpm. The OR circuit generates an "H"-level signal when the vehicle-speed judging unit generates an "H"-level signal or the engine-rotational speed judging device generates an "H"-level signal. On the other hand, the AND circuit generates an "H"-level signal when the neutral-position detecting unit generates an "H"-level signal and the OR circuit also generates an "H"-level signal. With the AND circuit outputting the "H"-level signal, the shift disabling unit prevents a shift change from being made.

13 Claims, 15 Drawing Sheets

SHIFT CONTROL UNIT OF ELECTRIC-POWER ASSIST TRANSMISSION

BACKGROUND OF THE INVENTION

1. Field of the Invention

The present invention relates to a shift control unit for an electric-power-assist transmission. In particular, the present invention relates to a shift control unit wherein a gear shift as well as the operations to put a main clutch in an engaged or disengaged state are carried out electrically. More specifically, the present invention relates to a shift control unit wherein a shift change is disabled if the speed of the vehicle or the rotational speed of the engine and a shift position of the gear satisfy conditions for disabling a shift change in spite of the fact that a shift switch has been turned on.

2. Description of the Background Art

In the conventional transmission, a gear shift is carried out by operating both a clutch pedal (or a clutch lever) and a shift-change lever. On the other hand, in an electric-power-assist transmission disclosed in Japanese Patent Laid-open No. Hei 5-39865, a gear shift is carried out electrically by a motor. In the conventional technologies described above, a shift drum is intermittently rotated in both directions by a driving motor so as to actuate a desired shift fork in a gearshift-change operation. On the other hand, it is possible to put the clutch in an engaged or disengaged state also by using a motor as well.

In such a case, when thinking of the conventional manual transmission, only by repeating the shift-change operation can the shift change be eventually completed even if the gear is not shifted smoothly. In addition, whether or not the clutch can be put in an engaged state smoothly after the shift change much depends on the operation of the clutch carried out by the driver.

As described above, in the conventional manual transmission, most of poor operatability as evidenced by whether or not a shift change can be completed without repeating the shift-change operation or whether or not the clutch can be put in an engaged state smoothly much depends on how the operation is carried out by the driver. In other words, the driver's learning effects allow good operatability to be obtained.

By driving both the clutch and the shift-change lever by means a motor, on the other hand, elements dependent on the operation carried out by the driver do not exist any more. Thus, in a state where a gear shift is impossible, if the clutch is not put in an engaged state smoothly or not in accordance with the driver's intention, it is quite within the bounds of possibility that the driver feels a sense of incompatibility.

In an electric-power-assist transmission, for example, a shift change can be made with ease by merely operating a switch. For this reason, while cruising at a high speed or while the engine is rotating at a high rotational speed, it is quite possibile that the gear may be shifted to a neutral position by mistake, causing a relatively strong engine brake to work. As a result, a heavy load is borne by the engine.

SUMMARY OF THE INVENTION

It is thus an object of the present invention to solve the problems described above by providing a shift control unit to be employed in an electric-power-assist transmission offering good operatability.

In order to achieve the object described above, the present invention provides a shift control unit to be employed in an electric-power-assist transmission wherein a shift change is disabled if the speed of a vehicle or the rotational speed of an engine and a shift position of the gear satisfy conditions for disabling a shift change in spite of the fact that a shift switch has been turned on.

According to the configuration described above, since a shift change is disabled when conditions for disabling a shift change are satisfied in spite of the fact that a shift switch has been turned on, the problem caused by an incorrect operation of the shift switch can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
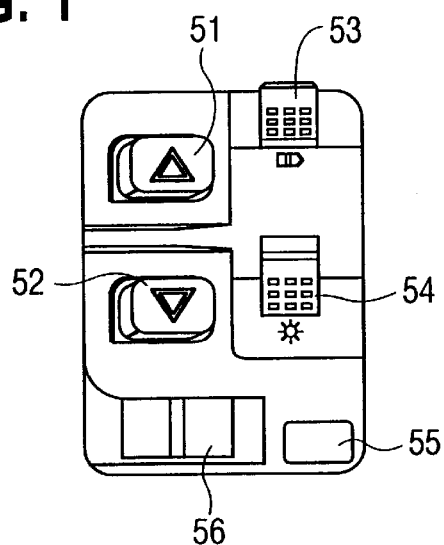
FIG. 1 is a plan diagram showing an operation unit of a vehicle on which the electric-power-assist transmission provided by the present invention is mounted.

The present invention will become more apparent from a careful study of the following detailed description of a preferred embodiment with reference to accompanying diagrams showing the embodiment. FIG. 1 is a plan diagram showing an operation unit of a vehicle on which the electric-power-assist transmission provided by the present invention is mounted.

As shown in the figure, the operation unit comprises a shift-up switch 51 for the electric-power-assist transmission and a shift-down switch 52 also for the electric-power-assist transmission, a dimmer switch 53 for changing the direction of a front light, a lighting switch 54 for turning on and off the front light, a start switch 55 for starting the engine and a stop switch 56 for stopping the engine. In the present embodiment, pressing the shift-up switch 51 once will raise the shift position by one stage. On the other hand, pressing the shift-down switch 52 once will lower the shift position by one stage.

Figure 2:
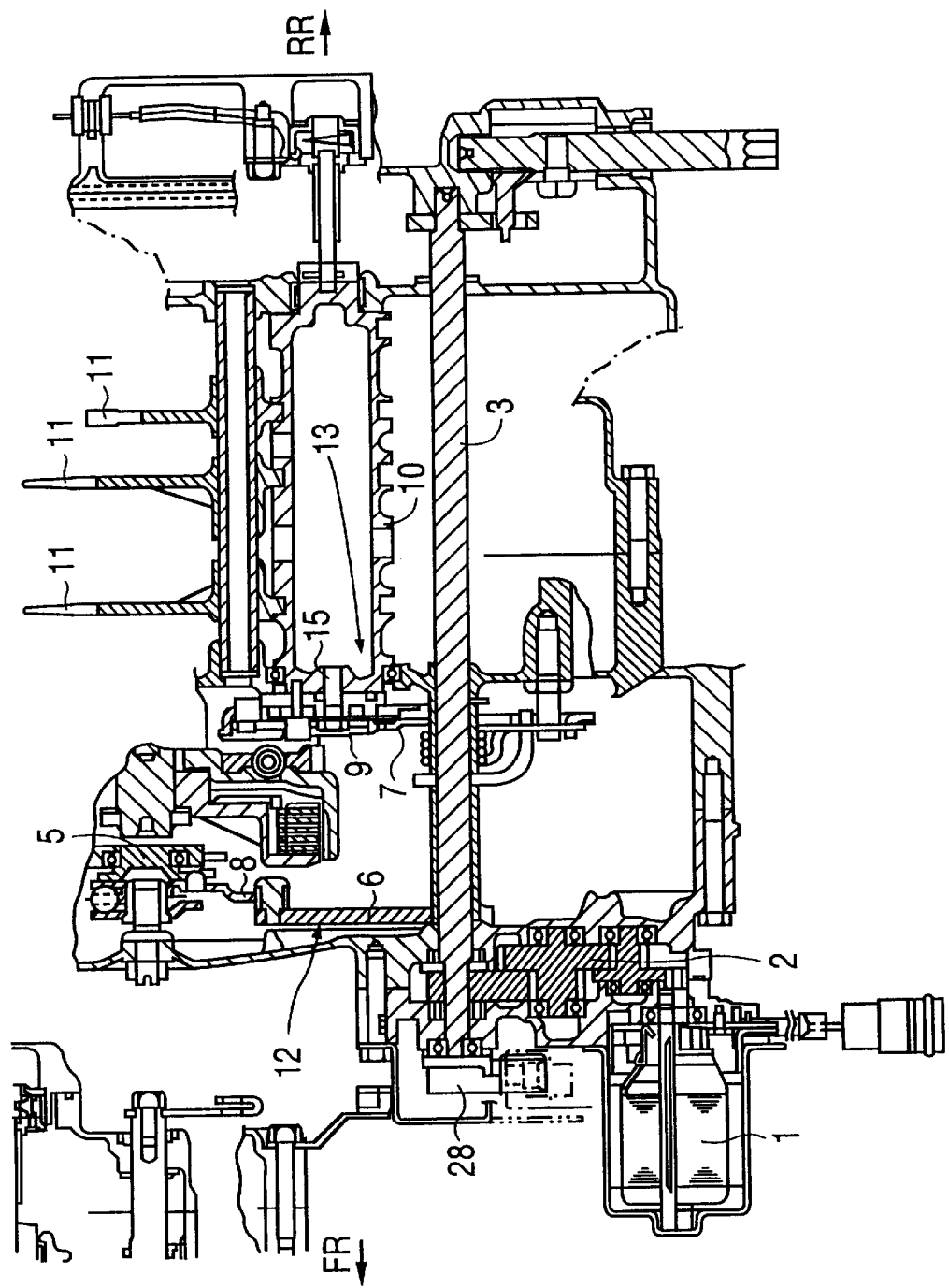
FIG. 2 is a diagram showing a partial cross section of the configuration of major components employed in a driving system of the electric-power-assist transmission provided by an embodiment of the present invention.

FIG. 2 is a diagram showing a partial cross section of the configuration of major components employed in a driving system of the electric-power-assist transmission provided by an embodiment of the present invention.

In the configuration shown in the figure, a driving motor 1 which serves as an electric actuator rotates a shift spindle 3 in a normal or reversed direction through a reduction gear mechanism 2. The rotational position (or the angle) of the shift spindle 3 is sensed by an angle sensor 28 which is installed at one end of the shift spindle 3. A clutch arm 6 extends perpendicularly to the shift spindle 3. At one end of the clutch arm 6, there is provided a gear mechanism 8 for converting the rotational movement of the shift spindle 3 into a rectilinear movement. When the shift spindle 3 is rotated away from a neutral position by the driving motor 1, the gear mechanism 8 releases the engaged state of a main clutch 5 without regard to the direction of the rotation in the course of the rotation. Clutch arm 6 and gear mechanism 8 are indicated generally as a transmission mechanism 12, which serves to put the main clutch 5 in an engaged or disengaged state in a manner which is mechanically coupled with the rotation of the shift spindle 3. When the shift spindle 3 is rotated back to reach the neutral position in the opposite direction, on the other hand, the engaged state of the main clutch 5 is restored in the course of the rotation in the reversed direction. The clutch arm 6 and the gear mechanism 8 are configured so that the engaged state of the main clutch 5 is released at a point of time the shift spindle 3 is rotated by a predetermined angle of typically +/−6 degrees.

One end of a master arm 7 fixed on the shift spindle 3 is engaged with a shift clutch mechanism 9 which is installed on a shift-drum mechanism 15. When the shift spindle 3 is rotated by the driving motor 1, a shift drum 10 is rotated in a direction determined by the rotational direction of the shift spindle 3. The master arm 7 and the shift clutch mechanism 9 form such a clutch mechanism that, when the shift spindle 3 is rotated away from the neutral position in either direction, the master arm 7 and the shift clutch mechanism 9 get engaged with the shift spindle 3, rotating the shift drum 10 and, when the shift spindle 3 is rotated back to the neutral position, the engaged state of the master arm 7 and the shift clutch mechanism 9 with the shift spindle 3 is released, leaving the shift drum 10 at a position where the engaged state is released. The master arm 7, shift clutch mechanism 9, shift drum 10 and shift-drum mechanism 15 are indicated generally as gear shifting mechanism 13, which acts to switch gears in a manner which is mechanically coupled to the rotation of the shift spindle 3.

The edge of each shift fork 11 is engaged with an external circumference groove 31 of one of sleeves 30 to be described later by referring to FIG. 4. When the shift drum 10 is rotated, the shift forks 11 are moved by the rotation of the shift drum 10 in a direction parallel to the axial direction of the rotation, moving one of the sleeves 30 determined by the rotational direction and the rotational angle of the shift drum 10 in a direction parallel to a main shaft 4.

Figure 4:
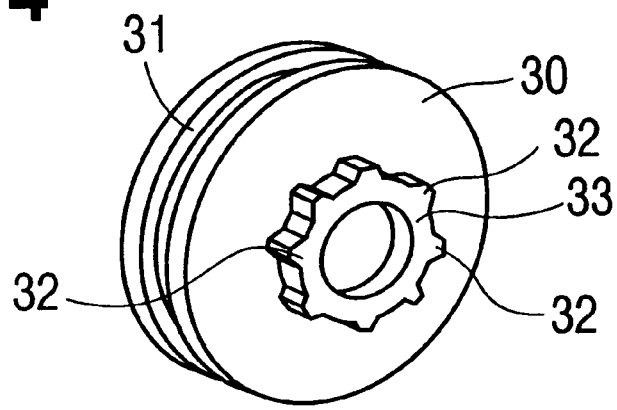
FIG. 4 is a diagram showing a perspective view of the sleeve provided by the present invention.

FIG. 4 is a diagram showing a perspective view of the sleeve 30 inserted in a state slidable in the axial direction of the main shaft which is not shown in the figure. On the circumference side surface of the sleeve 30, a groove 31 is provided in the circumferential direction. The edge of a shift fork 11 cited earlier is engaged with the groove 31. A plurality of outwardly-directed cogs 32 are provided on a ring-shaped flange 33 to form a single body on the circumference of the shaft hole of the sleeve 30. The outwardly-directed cogs 32 are engaged with inwardly-directed cogs 42 of a gear 40 to be described by referring to FIG. 5.

Figure 3:
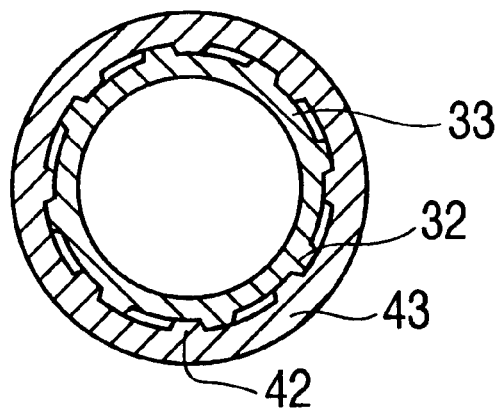
FIG. 3 is a conceptual diagram showing a state in which the sleeve and the gear are engaged with each other.
Figure 5:
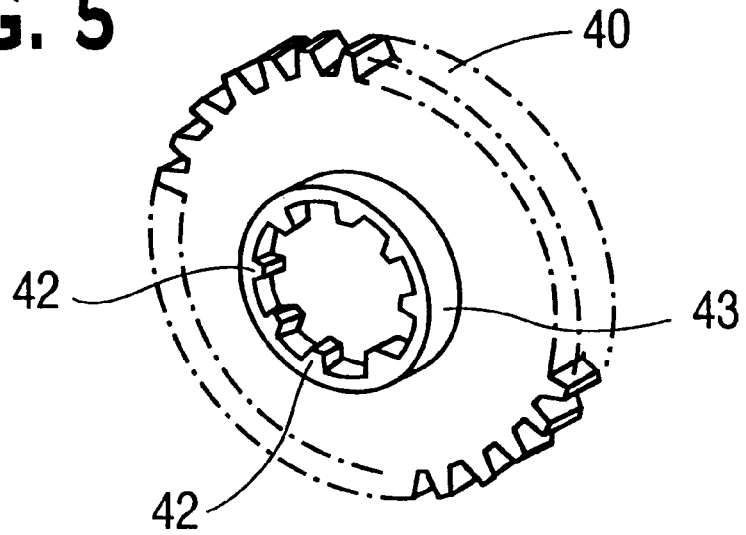
FIG. 5 is a diagram showing a perspective view of the gear provided by the present invention.

FIG. 5 is a diagram showing a perspective view of the gear 40 supported rotatably at a predetermined position on the main shaft which is not shown in the figure. A plurality of the inwardly-directed cogs 42 are provided on a ring-shaped flange 43 to form a single body on the circumference of the shaft hole of the gear 40. As described above, the inwardly-directed cogs 42 are engaged with the outwardly-directed cogs 32 of the sleeve 30. FIG. 3 is a conceptual diagram showing a state in which the outwardly-directed cogs 32 of the sleeve 30 and the inwardly-directed cogs 42 of the gear 40 are engaged with each other.

Figure 9:
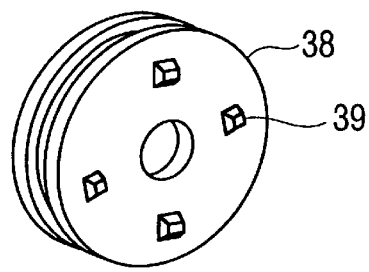
FIG. 9 is a diagram showing a perspective view of the conventional sleeve.
Figure 10:
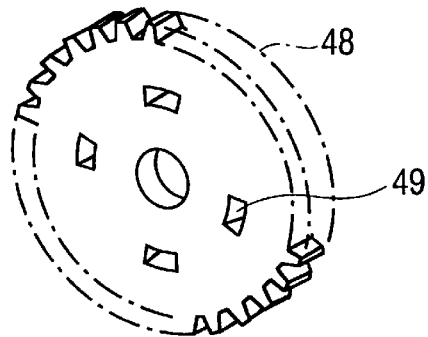
FIG. 10 is a diagram showing a perspective view of the conventional gear.

On the other hand, FIG. 9 is a diagram showing a perspective view of the conventional sleeve 38, and FIG. 10 is a diagram showing a perspective view of the conventional gear 48. As shown in FIG. 9, a plurality of stand-alone outwardly-directed protrusions 39 are provided on the sleeve 38 concentrically with respect to the shaft hole of the gear 48. In order to assure the strength of each of the stand-alone outwardly-directed protrusions 39, however, the area of the bottom surface of each of the stand-alone outwardly-directed protrusions 39 must be made relatively large. As a result, with the conventional technology, the ratio of the width of each of the outwardly-directed protrusions 39 to the length of the circumference on which the outwardly-directed protrusions 39 are provided increases, allowing only four outwardly-directed protrusions 39 to be created thereon as shown in FIG. 9. This holds true of slits 49 bored on the gear 48 shown in FIG. 10.

Figure 12:
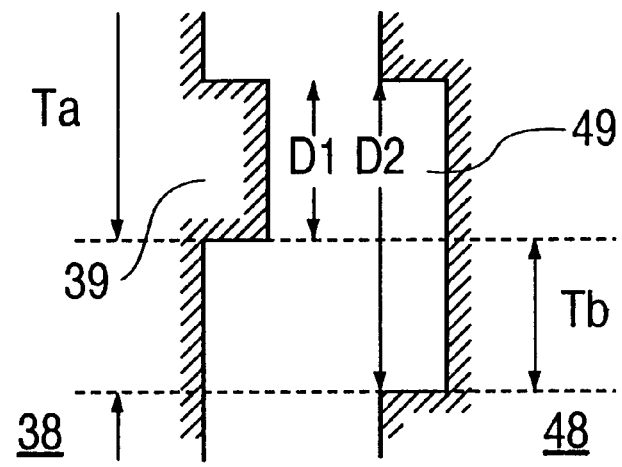
FIG. 12 is a diagram showing a model of engagement timing of the conventional sleeve and the conventional gear.

FIG. 12 is a diagram showing a model of relative positions of an outwardly-directed protrusion 39 on the conventional sleeve 38 and a slit 49 on the conventional gear 48. As shown in the figure, the width D2 of the slit 49 in the rotational direction is about twice the width D1 of the outwardly-directed protrusion 39. As a result, a period Ta during which the outwardly-directed protrusion 39 cannot be engaged with the slit 49 is long in comparison with a period Tb allowing the outwardly-directed protrusion 39 to be put in an engaged state with the slit 49. The state of engagement of the outwardly-directed protrusion 39 with the slit 38 is referred to hereafter as an engagement state.

Figure 13:
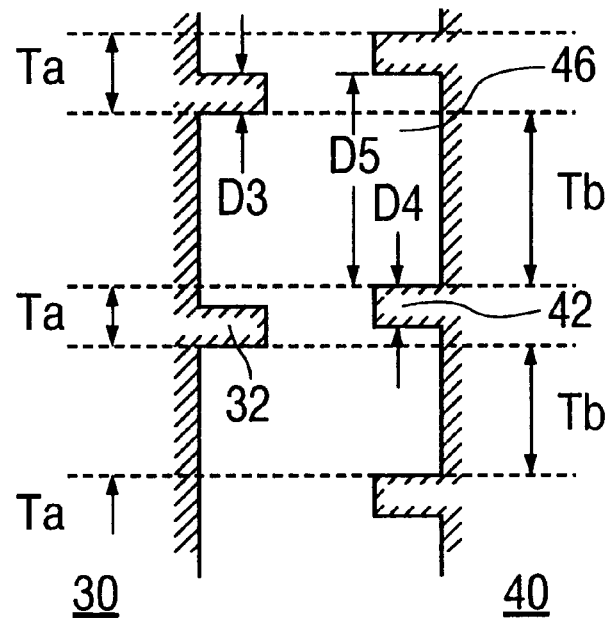
FIG. 13 is a diagram showing a model of engagement timing of the sleeve and the gear provided by the present invention.

In the case of the present embodiment, on the other hand, the outwardly-directed cogs 32 are provided on a ring-shaped flange 33 to form a single body. Thus, as shown in FIG. 13, the width D3 of the outwardly-directed cog 32 and the width D4 of the inwardly-directed cog 42 in the rotational direction can be made sufficiently small, yet with adequate strength maintained. FIG. 13 shows a model of engagement timing of the relative positions of an outwardly-directed cog 32 on the sleeve 30 provided by the present embodiment and an inwardly-directed cog 42 on the gear 40 provided by the present invention. As a result, the period Ta during which the engagement state is impossible is short in comparison with the period Tb making an engagement state possible, increasing the probability of the engagement state. In this case, the engagement state is a state of engagement of the outwardly-directed cog 32 with a slit 46 on the gear 40.

In addition, in the present embodiment, the difference between the width D5 in the rotational direction of the slit 46 and the width D3 in the rotational direction of the outwardly-directed cog 32 can be made small, allowing the play after the engagement of the outwardly-directed cog 32 with the slit 46 to be reduced. As a result, the magnitude of a shift shock and the amount of noise generated in the engagement can also be decreased.

Figure 6:
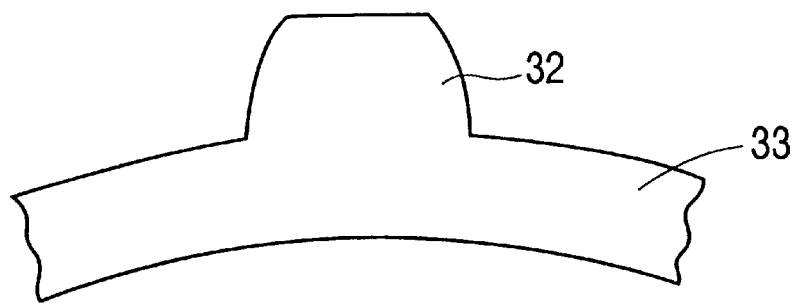
FIG. 6 is a diagram showing an enlarged portion of a outwardly-directed cog of the sleeve.
Figure 7:
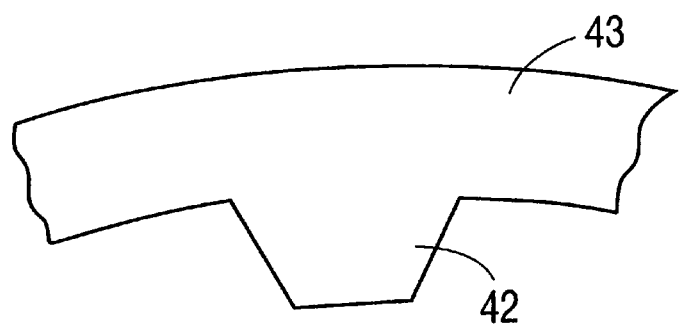
FIG. 7 is a diagram showing an enlarged portion of a inwardly-directed cog of the gear.
Figure 8:
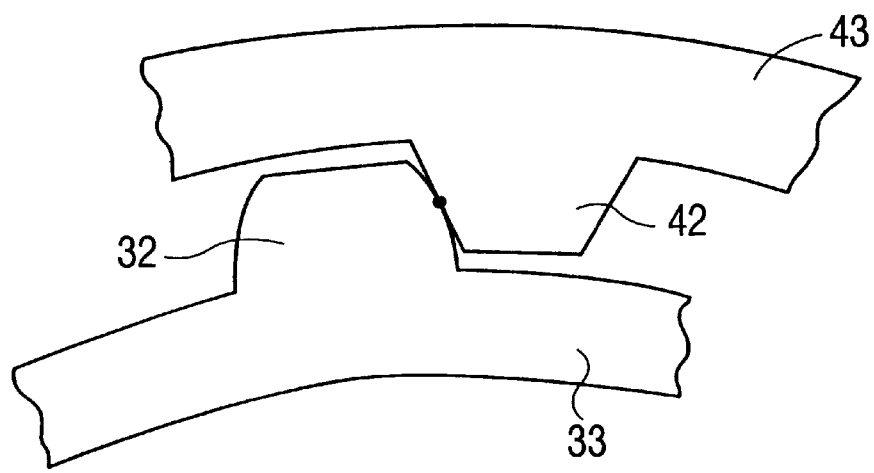
FIG. 8 is a diagram showing a state in which the outwardly-directed cog of the sleeve and the inwardly-directed cog of the gear are engaged with each other.

In addition, in the present embodiment, the taper of the outwardly-directed cog 32 is bent to form a convex shape as shown in FIG. 6, while the taper of the inwardly-directed cog 42 has a straight-line shape as shown in FIG. 7. Thus, the cogs 32 and 42 can be brought into line contact with each other in the axial direction as shown in FIG. 8, allowing concentration of stress to be avoided. As a result, the cog strength can be increased substantially and, at the same time, the durability and the resistance against abrasion can also be improved as well.

In the configuration described above, the sleeves 30 are moved in parallel by the shift forks 11 to a predetermined position, causing the outwardly-directed cogs 32 on one of the sleeves 30 to be put in an engaged state with the slits 46 of the gear 40. In this engagement state, the gear 40 which has been supported in an idle state so far with respect to the main shaft is engaged with the main shaft by the sleeve 30, being rotated synchronously with the main shaft as is generally known. As a result, a rotating force transferred from a clutch shaft to a countershaft is transferred to the main shaft by way of the gear. It should be noted that both the clutch shaft and countershaft are not shown in the figure.

It is worth noting that, while not shown explicitly in the figure, the engine of the vehicle employing the electric-power-assist transmission adopting the shift control method provided by the present invention is a four cycle engine. In a power transmission system for transferring power from the crankshaft to the main shaft, a power output by the engine is transferred through a centrifugal clutch on the crankshaft and a clutch on the main shaft. Thus, for an engine rotational speed lower than a predetermined value, the centrifugal clutch on the crankshaft stops the transfer of power to the clutch on the main shaft. As a result, the gear can be shifted to any speed if the vehicle is in a halted state.

Figure 14:
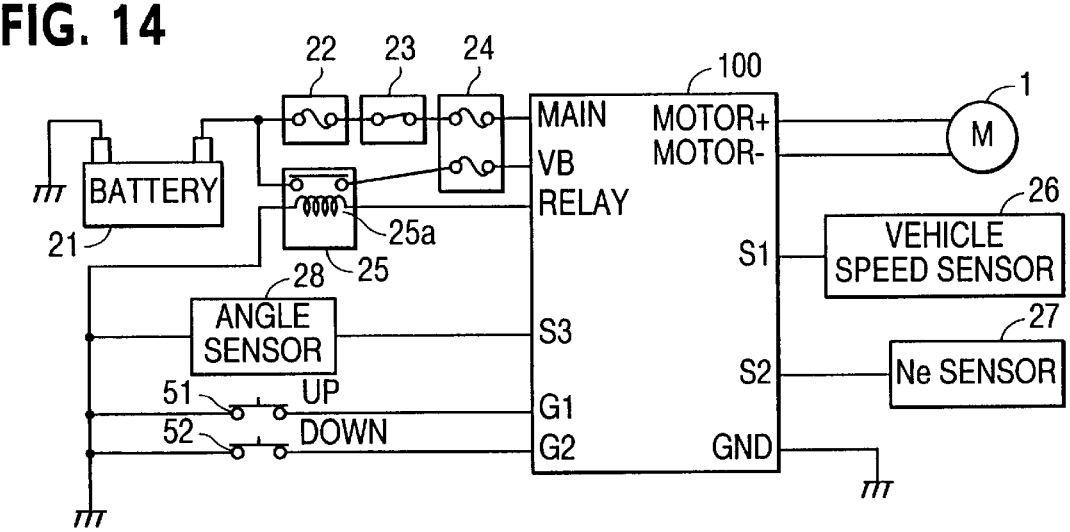
FIG. 14 is a block diagram showing the configuration of major components employed in a control system of the electric-power-assist transmission provided by the embodiment of the present invention.
Figure 15:
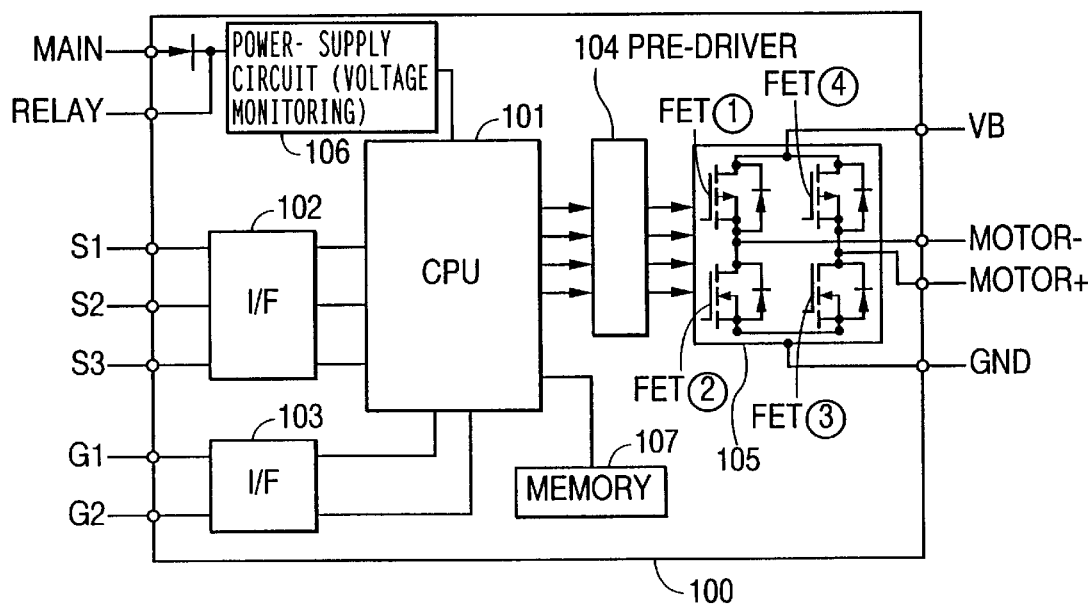
FIG. 15 is a block diagram showing a typical configuration of an ECU employed in the control system shown in FIG. 14.

FIG. 14 is a block diagram showing the configuration of major components employed in a control system of the electric-power-assist transmission provided by the embodiment of the present invention and FIG. 15 is a block diagram showing a typical configuration of an ECU 100 employed in the control system shown in FIG. 14.

As shown in FIG. 14, the driving motor 1 described earlier is connected between motor+ and motor− pins of the Electronic Control Unit (ECU) 100. Sensor-signal pins S1, S2 and S3 are connected respectively to a vehicle-speed sensor 26 for sensing the speed of the vehicle, an Ne sensor 27 for sensing the rotational speed Ne of the engine, and the angle sensor 28 described earlier for sensing the rotational angle of the shift spindle 3. Shift-instruction pins G1 and G2 are connected to the shift-up and shift-down switches 51 and 52 described earlier.

A battery 21 is connected to a main pin of the ECU 100 through a main fuse 22, a main switch 23 and a fuse box 24. The battery 21 is also connected to a VB pin through a fail-safe (FIS) relay 25 and the fuse box 24. An excitation coil 25a of the fail-safe relay 25 is connected to a relay pin.

As shown in FIG. 15, the main and relay pins of the ECU 100 are connected internally to a power-supply circuit 106 which is connected to a CPU 101. The sensor-signal pins S1, S2 and S3 are connected to input pins of the CPU 101 through an interface circuit 102. The shift-instruction pins G1 and G2 are connected to input pins of the CPU 101 through an interface circuit 103.

A switching circuit 105 comprises a FET (1) and a FET (2) connected in series and a FET (3) and a FET (4) also connected in series. The series circuit of the FET (1) and the FET (2) and the series circuit of the FET (3) and the FET (4) are connected to each other to form a parallel circuit. One terminal of the parallel circuit is connected to the VB pin while the other terminal is connected to a GND pin. The junction point between the FET (1) and the FET (2) is connected to the motor− pin while the junction point between the FET (3) and the FET (4) is connected to the motor+pin. The FETs (1) to (4) are selectively controlled by pulse width modulation (PWM) by the CPU 101 through a predriver 104. The control of the FETs (1) to (4) carried out by the CPU 101 is based on a control algorithm stored in a memory unit 107.

Figure 22:
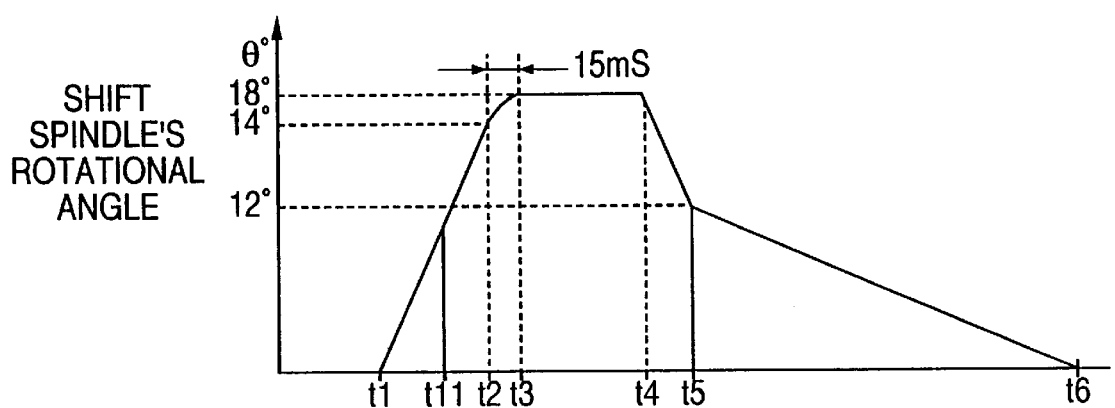
FIG. 22 is a diagram showing operational timing charts of a shift spindle provided by the present invention.

Next, the shift control method implemented by the electric-motor-assist transmission provided by the present invention is explained by referring to flowcharts shown in FIGS. 16 to 21 and operational timing charts shown in FIG. 22.

Figure 16:
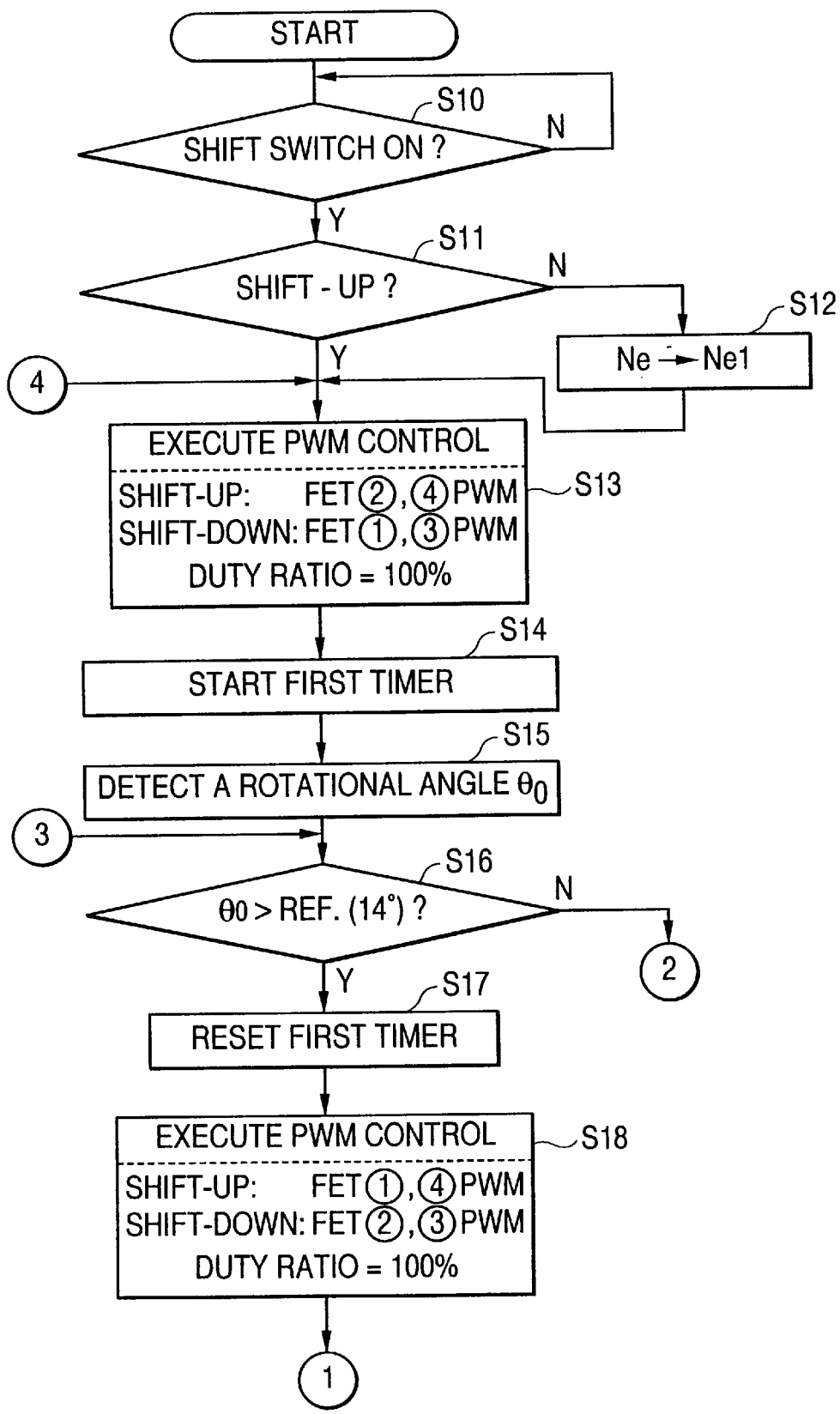
FIG. 16 is a diagram showing Part I of a flowchart provided by the embodiment of the present invention.

The flowchart shown in FIG. 16 begins with a step S10 to form a judgment as to whether or not either the shift-up or shift-down switch 51 or 52 has been operated. If one of the switches is found turned on, the flow of control goes on to a step S11 to form a judgment as to whether it is the shift-up switch 51 or the shift-down switch 52 that has been turned on. If it is the shift-up switch 51 that has been turned on, the flow of control proceeds to a step S13. If it is the shift-down switch 52 that has been turned on, on the other hand, the flow of control proceeds to a step S12 at which the rotational speed Ne of the engine is stored in a variable Ne1. The flow of control then continues to the step S13.

At the step S13, the FETs employed in the switching circuit 105 of the ECU 100 are selectively controlled by PWM in dependence on whether it is the shift-up switch 51 or the shift-down switch 52 that has been turned on starting from a point of time T1 of the time chart shown in FIG. 22. To be more specific, if it is the shift-up switch 51 that has been turned on, the FETs (2) and (4) are controlled by PWM at a duty ratio of 100% with the FETs (1) and (3) turned off. As a result, the driving motor 1 starts to rotate in a shift-up direction, driving the shift spindle 3 also to rotate in the shift-up direction as well in a manner interlocked with the driving motor 1.

If it is the shift-down switch 52 that has been turned on, on the other hand, the FETs (1) and (3) are controlled by PWM at a duty ratio of 100% with the FETs (2) and (4) turned off. As a result, the driving motor 1 starts to rotate in a shift-down direction, a direction opposite to the shift-up direction, driving the shift spindle 3 also to rotate in the shift-down direction as well in a manner interlocked with the driving motor 1.

By setting the duty ratio at 100% in this way, the speed of the shift can be increased, allowing the duration of the shift to be shortened. As a result, the clutch can be put in a disengaged state in a short period of time. It should be noted that the present embodiment is designed so that, by rotating the shift spindle by merely five to six degrees, the clutch can be put in a disengaged state.

The flow of control then goes on to a step S14 at which a first timer not shown in the figure is started to measure time. Then, the flow of control proceeds to a step S15 at which a rotational angle $\theta_0$ of the shift spindle 3 detected by means of the angle sensor 28 is read in. Subsequently, the flow of control goes on to a step S16 to compare the detected rotational angle $\theta_0$ with a first reference angle $\theta_{ref}$ which is set at +/−14 degrees in the case of the present embodiment. To be more specific, the flow of control proceeds to the step S16 to form a judgment as to whether or not the rotational angle $\theta_0$ exceeds the reference angle $\theta_{ref}$. More specifically, the judgment formed at the step S16 is a judgment as to whether or not the rotational angle $\theta_0$ is equal to or greater than 14 degrees, or the rotational angle $\theta_0$ is equal to or smaller than −14 degrees. It should be noted that, in the following description, the phrase stating "a quantity goes beyond a +/− value" is used to imply that either the quantity is equal to or greater than the + value, or the quantity is equal to or smaller than the value − for the sake of expression simplicity.

An outcome of the judgment formed at the step S16 indicating that the rotational angle $\theta_0$ goes beyond 14 degrees means that it is quite within the bounds of possibility that the sleeves moved in parallel by the shift forks 11 have arrived at a normal engaged (engagement) position. In this case, the flow of control goes on to a step S17. On the other hand, an outcome of the judgment formed at the step S16 indicating that the rotational angle $\theta_0$ does not go beyond +/−14 degrees means that it is quite within the bounds of possibility that the sleeves moved in parallel by the shift forks 11 have not arrived at the normal engaged (engagement) position. In this case, the flow of control goes on to a step S30 to be described later.

When the fact that the sleeves moved in parallel by the shift forks 11 have arrived at the normal engaged (engagement) position is detected at a point of time t2 as a result of the comparison of the rotational angle $\theta_0$ with the reference rotational angle $\theta_{ref}$, the flow of control proceeds to the step S17 at which the first timer is reset. The flow of control then continues to a step S18 at which the FETs employed in the switching circuit 105 of the ECU 100 are selectively controlled by PWM in dependence on whether it is the shift-up switch 51 or the shift-down switch 52 that has been turned on. To be more specific, if it is the shift-up switch 51 that has been turned on, the FETs (1) and (4) are controlled by PWM at a duty ratio of 100% with the FETs (2) and (3) turned off. If it is the shift-down switch 52 that has been turned on, on the other hand, the FETs (2) and (4) are controlled by PWM at a duty ratio of 100% with the FETs (1) and (3) turned off. As a result, the input pins of the driving motor 1 are short-circuited, providing a rotational load to the driving motor 1. In this state, a braking effect is applied to the driving force working in the shift-up or shift-down direction of the shift spindle 3, reducing the magnitude of an impact of the shift spindle 3 on a stopper. Such an impact is generated when the shift spindle 3 is brought into contact with the stopper. It should be noted that the rotational angle of the shift spindle 3 at which the shift spindle 3 is brought into contact with the stopper is 18 degrees.

Figure 17:
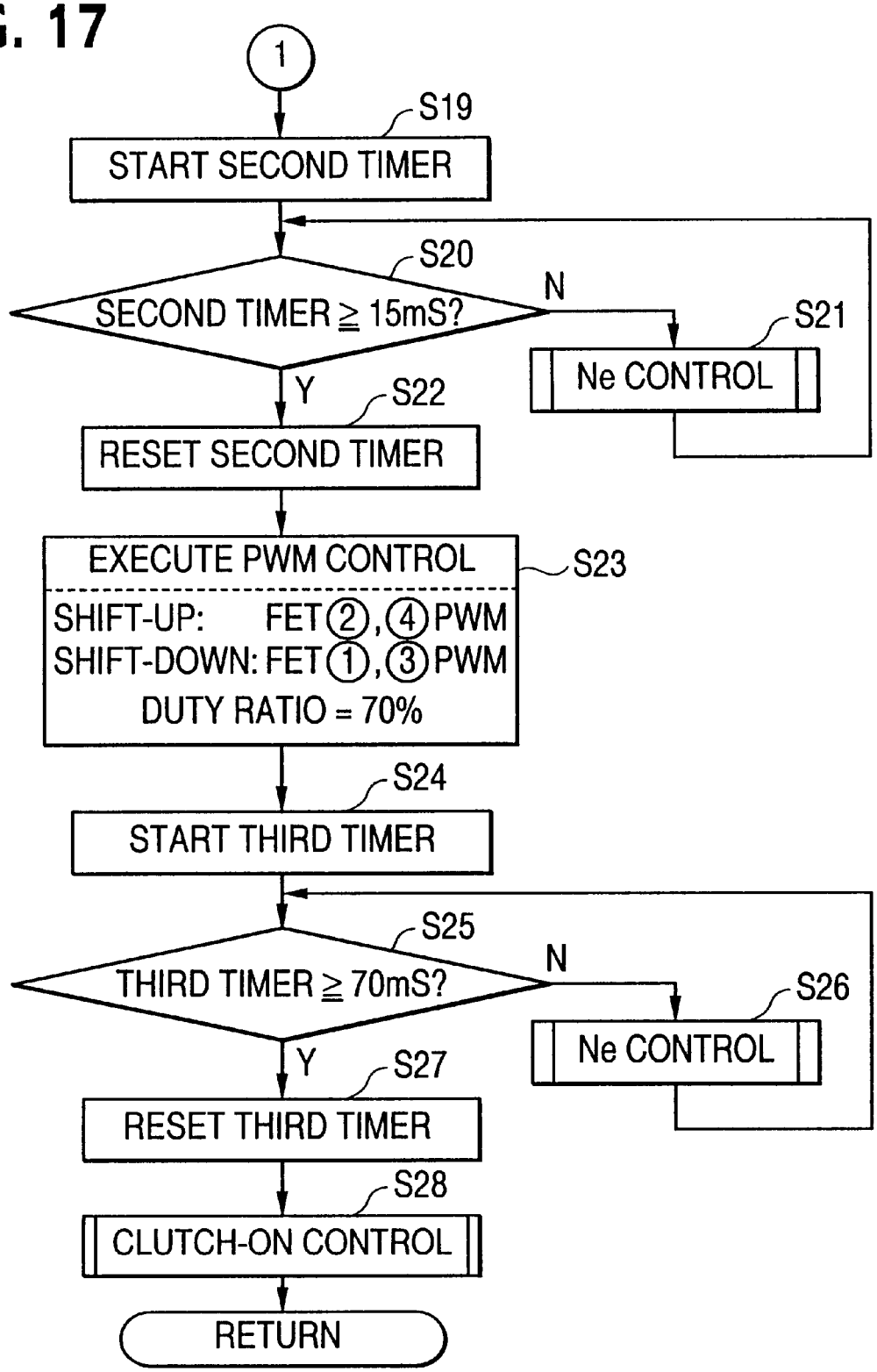
FIG. 17 is a diagram showing Part II of a flowchart provided by the embodiment of the present invention.

The flow of control then goes on to a step S19 shown in FIG. 17 at which a second timer not shown in the figure is started to measure time. Then, the flow of control proceeds to a step S20 to form a judgment as to whether or not the time measured by the second timer has exceeded 15 ms. If the time measured by the second timer has not exceeded 15 ms, the flow of control continues to a step S21 to execute control of the rotational speed Ne of the engine to be described later. The processing at the steps S20 and S21 are repeated until the time measured by the second timer exceeds 15 ms. As the time measured by the second timer exceeds 15 ms at a point of time t3, the flow of control goes on to a step S22 at which the second timer is reset.

Subsequently, the flow of control proceeds to a step S23 at which the FETs employed in the switching circuit 105 of the ECU 100 are selectively controlled by PWM in dependence on whether it is the shift-up switch 51 or the shift-down switch 52 that has been turned on. To be more specific, if it is the shift-up switch 51 that has been turned on, the FETs (2) and (4) are controlled by PWM at a duty ratio of 70% with the FETs (1) and (3) turned off. If it is the shift-down switch 52 that has been turned on, on the other hand, the FETs (1) and (3) are controlled by PWM at a duty ratio of 70% with the FETs (2) and (4) turned off. As a result, since the sleeves are pushed against the gear by a relatively weak torque, the load borne by each cog is reduced until the engaged (engagement) state is reached, allowing the engagement state to be sustained with a high degree of reliability.

The flow of control then goes on to a step S24 at which a third timer not shown in the figure is started to measure time. Then, the flow of control proceeds to a step S25 to form a judgment as to whether or not the time measured by the third timer has exceeded 70 ms . If the time measured by the third timer has not exceeded 70 ms , the flow of control continues to a step S26 at which the control of the rotational speed Ne of the engine is executed. The pieces of processing at the steps S25 and S26 are repeated until the time measured by the third timer exceeds 70 ms. As the time measured by the third timer exceeds 70 ms at a point of time t4, the flow of control goes on to a step S27 at which the third timer is reset. The flow of control then proceeds to a step S28 to start clutch-on control to be described later.

It should be noted that the time-up time of the third timer adopted in the present embodiment is determined from the period Ta during which an engaged state cannot be established as described earlier by referring to FIG. 13. To put it in detail, the time-up time of 70 ms is set so that the control to push the sleeves against the gear is executed at least until the period Ta is over. In the meantime, the outwardly-directed cogs are brought into contact with the inwardly-directed cogs. Since the duty ratio has been reduced to 70%, however, the load borne by each cog is light, being favorable to the strength of the cog.

In addition, the time-up time of the third timer does not have to be set at a fixed value. The time-up time can be set at a variable value determined as a function of gear setting. For example, the time-up time is set at 70 ms and 90 ms for the gear set at the range first to third speeds and the range fourth to fifth speeds respectively.

Figure 18:
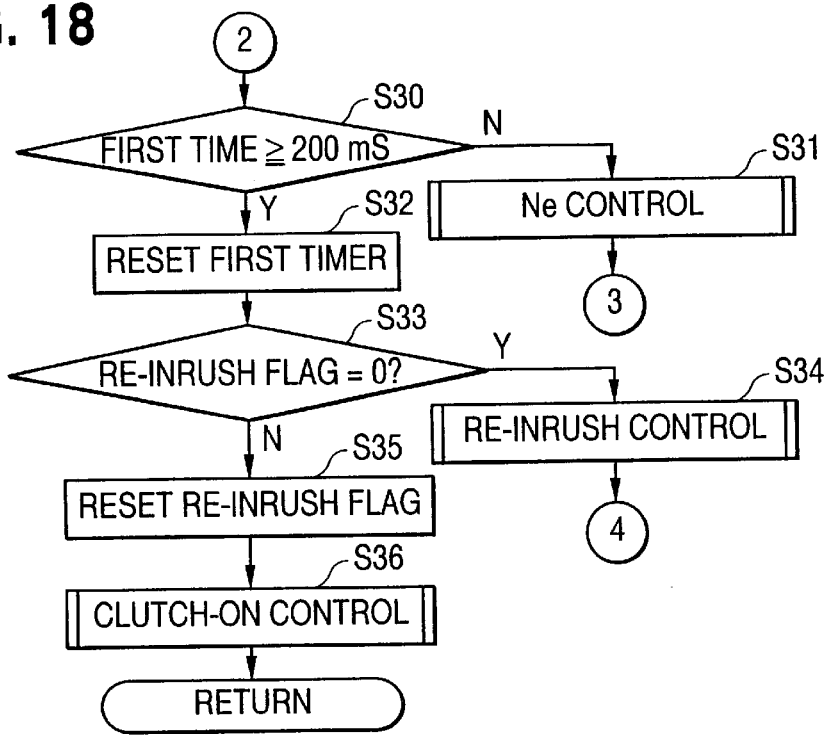
FIG. 18 is a diagram showing Part III of a flowchart provided by the embodiment of the present invention.

If the outcome of the judgment formed at the step S16 shown in FIG. 16 indicates that the rotational angle $\theta_0$ has not exceeded the first reference angle $\theta_{ref}$, on the other hand, the flow of control goes on to the step S30 shown in FIG. 18 to form a judgment as to whether or not the time measured by the first timer has exceeded 200 ms. Since the outcome of the judgment formed for the first time indicates that the time measured by the first timer has not exceeded 200 ms, the flow of control goes on to a step S31 at which the Ne control is executed before returning to the step S16 shown in FIG. 16.

As time goes by, the outcome of the judgment formed at the step S30 indicates that the time measured by the first timer has exceeded 200 ms, implying that the shift change attempted this time ends in a failure. In this case, the flow of control goes on to a step S32 at which the first timer is reset. The flow of control then proceeds to a step S33 at which the value of a re-inrush flag to be described later is referenced. A reset state of the re-inrush flag, that is, a value thereof of zero, indicates that re-inrush control to be described later has not been executed. In this case, the flow of control continues to a step S34 at which the re-inrush control is executed for the first time. The in-rush control is executed because, in some cases, the driver feels a sense of incompatibility if it takes a long time to accomplish a shift change.

On the other hand, a set state of the re-inrush flag, that is, a value thereof of one, indicates that the shift change was not successful in spite of the fact that the re-inrush control was executed. In this case, the flow of control continues to a step S35 at which the clutch is put in an engaged state without making a shift change. At the same time, the re-inrush flag is reset. The flow of control then goes on to a step S36 at which the clutch-on control to be described later is executed.

Figure 19:
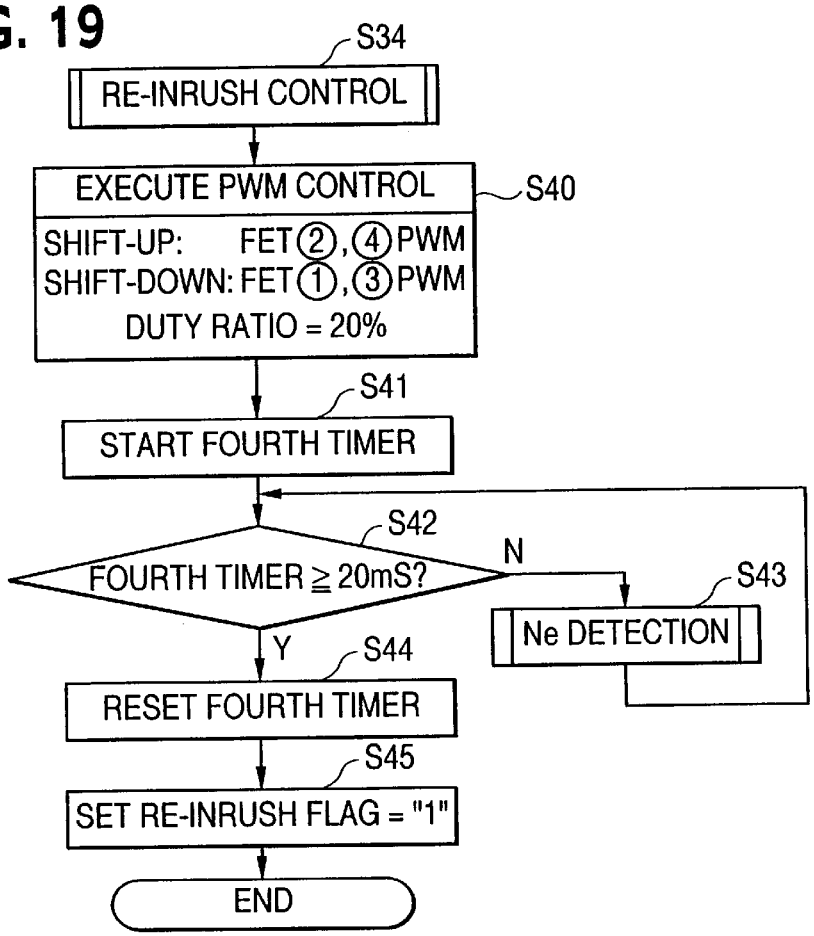
FIG. 19 is a diagram showing Part IV of a flowchart provided by the embodiment of the present invention.

Next, a method adopted for the re-inrush control is explained by referring to the flowchart shown in FIG. 19. carried out when the sleeves driven by the shift forks into a parallel movement in the axial direction did not arrive at the normal engagement position, the re-inrush control is processing of making a re-movement (re-inrush) attempt to once reduce the movement torque before applying a predetermined torque again to the shift forks.

As shown in the figure, the flowchart begins with a step S40 at which the duty ratio of the FETs under the PWM control is reduced to 20%. To be more specific, the duty ratio of the FETs (2) and (4) or that of the FETs (1) and (3) is reduced in a shift-up operation or in a shift-down operation respectively. As a result, the driving torque applied to the shift forks 11 is weakened.

The flow of control then goes on to a step S41 at which a fourth timer not shown in the figure is started to measure time. Then, the flow proceeds to a step S42 to form a judgment as to whether or not the time measured by the fourth timer has exceeded 20 ms. If the time measured by the fourth timer has not exceeded 20 ms, the flow of control continues to a step S43 at which the Ne control is executed. If the time measured by the fourth timer has exceeded 20 ms, on the other hand, the flow of control goes on to a step S44 at which the fourth timer is reset. The flow of control then goes on to a step S45 at which the re-inrush flag is set. Then, the flow of control returns to the step S13 shown in FIG. 16 at which the driving motor 1 is again controlled by PWM at a duty ratio of 100%, applying a large torque to the shift forks as usual.

As described above, in the present embodiment, if a shift change is not made normally, the torque applied to the shift forks is once weakened before being strengthened again to push forth the sleeves. As a result, the operation to re-inrush the sleeves can be carried out with ease.

Figure 23:
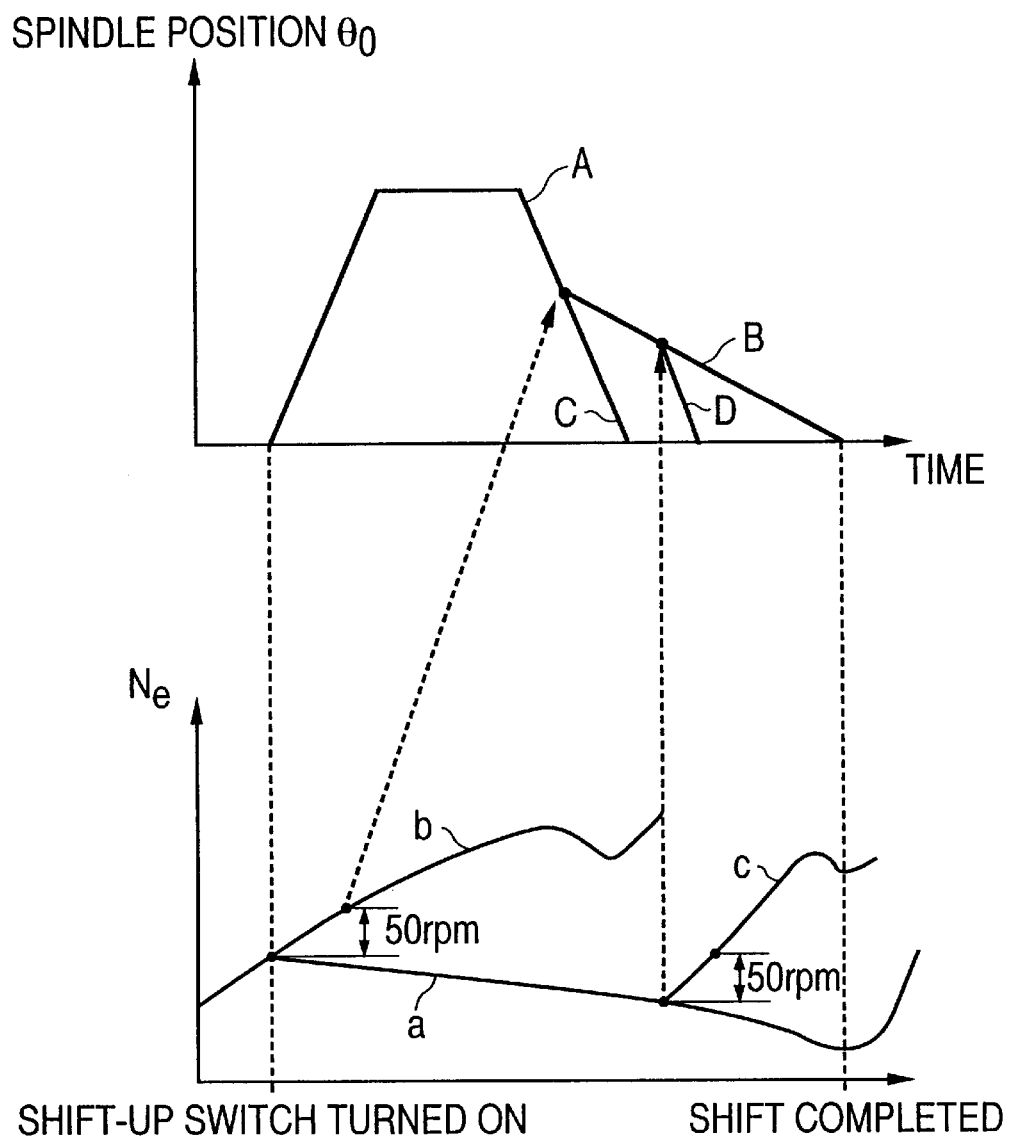
FIG. 23 is a diagram showing operational timing charts of the rotational angle of a shift spindle and the rotational speed of the engine provided by the present invention in a shift-up operation.
Figure 24:
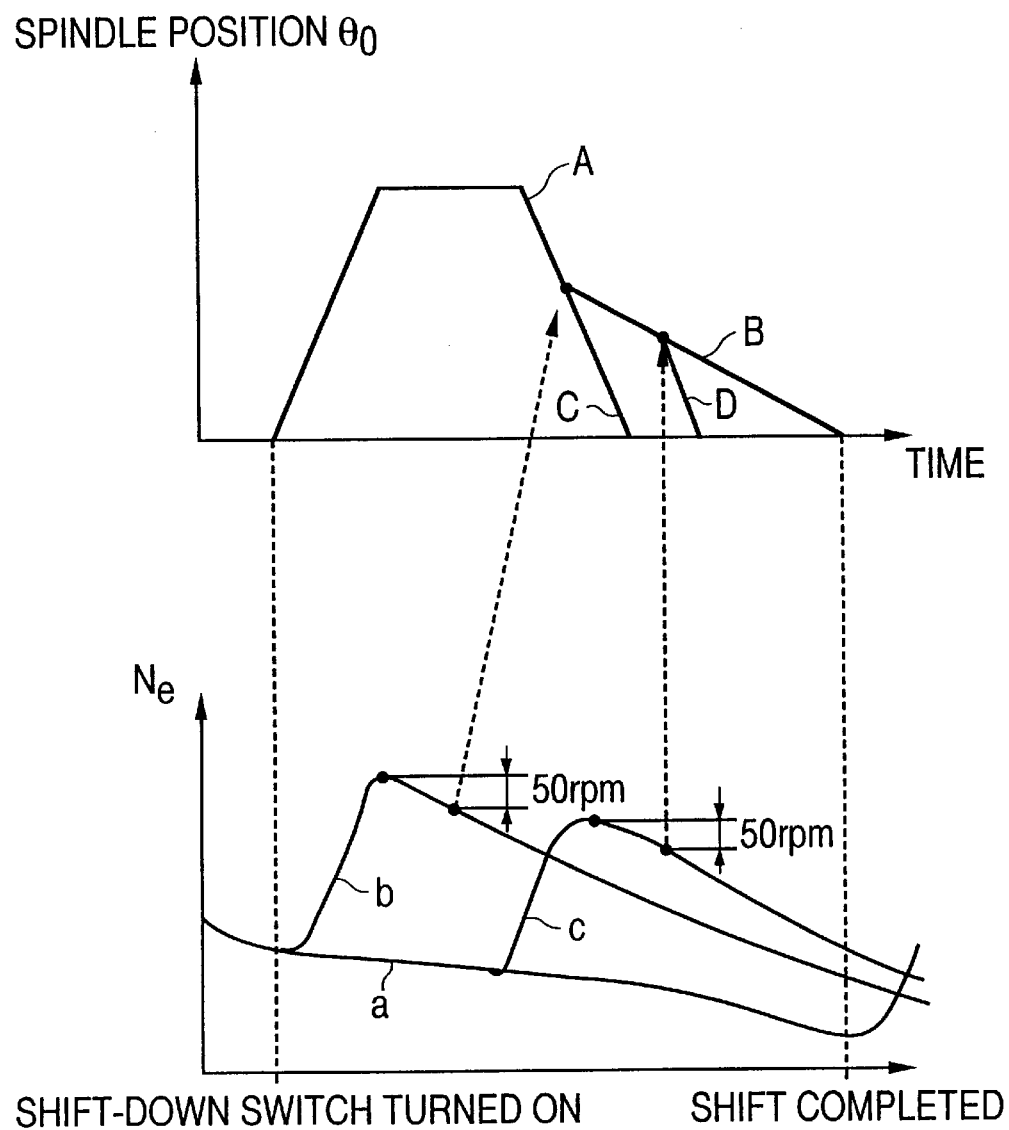
FIG. 24 is a diagram showing operational timing charts of the rotational angle of a shift spindle and the rotational speed of the engine provided by the present invention in a shift-down operation.

Next, essentials and general operations of the Ne control and the clutch-on control cited above are explained by referring to FIGS. 23 and 24 respectively prior to a detailed description of the operations thereof.

As described by referring to FIG. 22, in the present embodiment, when the rotation of the shift spindle is started at the point of time T1, the engagement of the clutch is released at a point of time t2 and the rotation of the shift spindle is completed at the point of time t3. Later on, at the point of time t4, the control to push the sleeves is executed before a transition to the clutch-on control, control to put the clutch in an engaged state.

In the clutch-on control, the clutch is put in an engaged state slowly in order to reduce the magnitude of a generated shift shock. In other words, it is necessary to lower the rotational speed of the shift spindle 3. On the other hand, the speed of a shift change is dependent on the rotational speed of the shift spindle 3. It is thus necessary to increase the rotational speed of the shift spindle 3 in order to implement a fast shift change.

In order to satisfy the two requirements described above at the same time, according to the present invention, in a period from the point of time t4 to the point of time t5, the shift spindle 3 is rotated at a high rotational speed until a zone in close proximity to an angular range to put the clutch in an engaged state is reached whereas, after the point of time t5, that is, in the angular range to put the clutch in an engaged state, the shift spindle 3 is rotated at a low rotational speed as shown in the time chart of FIG. 22. By executing such two-stage return control in the present embodiment, the magnitude of the generated shift shock and the time it takes to make a shift change can be both reduced simultaneously.

In addition, in the present embodiment, the timing to put the clutch in an engaged state is controlled to timing optimum for the operation of the accelerator pedal carried out by the driver. FIG. 23 is a diagram showing operational timing charts representing changes of the rotational angle $\theta_0$ of the shift spindle in the clutch-on control and the rotational speed of the engine in the Ne control in a shift-up operation. On the other hand, FIG. 24 is a diagram showing operational timing charts representing changes of the rotational angle $\theta_0$ of the shift spindle in the clutch-on control and the rotational speed of the engine in the Ne control in a shift-down operation.

As shown in FIG. 23, as a general practice in a shift-up operation, the control method comprises the steps of restoring the accelerator pedal, turning on the shift-up switch 51, letting a shift change take place, putting the clutch back in an engaged state and opening the accelerator. In the mean time, the rotational speed Ne of the engine changes as shown by a solid line a. At that time, the shift spindle is controlled as shown by solid lines A and B.

It is also quite within the bounds of possibility, however, that the driver turns on the shift-up switch 51 without restoring the accelerator pedal or opens the accelerator before the clutch is put back in an engaged state. In such a case, it is desirable to put the clutch in an engaged state quickly since the driver usually desires a fast shift change.

In the present embodiment, changes in engine rotational speed Ne represented by a solid line b indicate that the driver has turned on the shift-up switch 51 without restoring the accelerator pedal. In this case, quick return control of the rotational angle $\theta_0$ of the shift spindle to put the clutch in an engaged state immediately is executed as shown by a solid line C. On the other hand, changes in engine rotational speed Ne represented by a solid line c indicate that the driver has opened the accelerator with timing preceding timing to put the clutch in a re-engaged state. In this case, quick return control of the rotational angle $\theta_0$ of the shift spindle to put the clutch in an engaged state immediately is executed as shown by a solid line D.

As a general practice in a shift-down operation, on the other hand, as shown in FIG. 24, the control method comprises the steps of restoring the accelerator pedal, turning on the shift-down switch 52, letting a shift change take place, putting the clutch back in an engaged state and opening the accelerator. In the mean time, the rotational speed Ne of the engine changes as shown by a solid line a. At that time, the shift spindle is subject to two-stage control as shown by solid lines A and B.

In a shift-down operation, however, the engine may be revved. In such a case, it is desirable to put the clutch in an engaged state quickly since quick engagement of the clutch in such a state will generate a shift shock having a small magnitude.

In the present embodiment, changes in engine rotational speed Ne represented by a solid line b or c indicate that the engine has been revved. In this case, quick return control of the rotational angle $\theta_0$ of the shift spindle to put the clutch in an engaged state immediately is executed as shown by a solid line C or D respectively.

Figure 20:
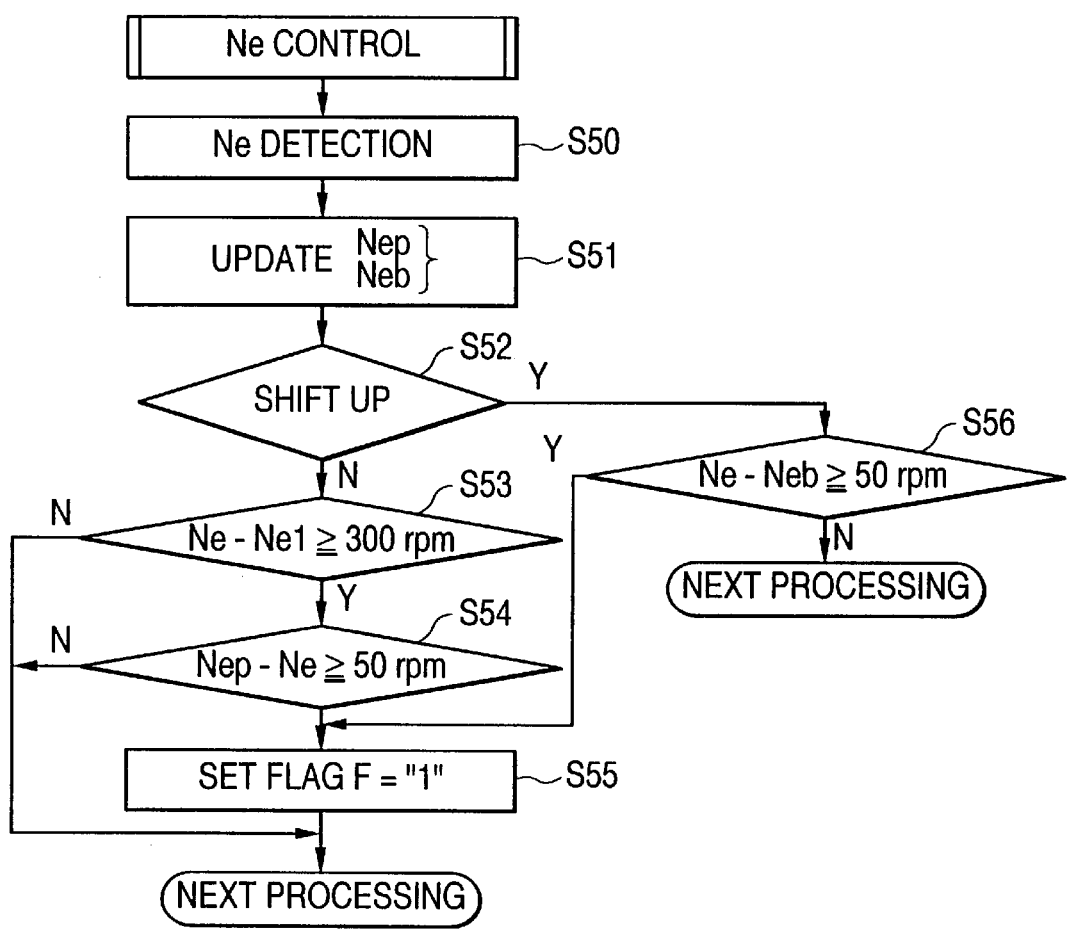
FIG. 20 is a diagram showing Part V of a flowchart provided by the embodiment of the present invention.

Next, operations of the Ne control and the clutch-on control for implementing the two-stage control and the quick return control are explained in detail. FIG. 20 is a diagram showing a flowchart representing the method of the Ne control carried out at the steps S21, S26, S31 and S43.

As shown in the figure, the flowchart begins with a step S50 at which the rotational speed Ne of the engine is measured. The flow of control then goes on to a step S51 at which a peak-hold value Nep or a bottom-hold value Neb of the rotational speed Ne of the engine measured so far is updated in dependence on the value of the rotational speed Ne of the engine measured at the step S50. Then, the flow of control proceeds to a step S52 to form a judgment as to whether the shift change is a shift up or a shift down. If the shift change is a shift up, the flow of control continues to a step S56. If the shift change is a shift down, on the other hand, the flow of control continues to a step S53.

At the step S56, the rotational speed Ne of the engine measured at the step S50 is compared with the bottom-hold value Neb updated at the step S51 in order to form a judgment as to whether or not the difference between the two (Ne−Neb) is equal to or greater than 50 rpm.

This judgment is a judgment as to whether or not the accelerator is closed in a shift-up operation. A difference (Ne−Neb) equal to or greater than 50 rpm indicates that the driver has turned on the shift-up switch 51 without restoring the accelerator pedal or has opened the accelerator with timing preceding timing to put the clutch in a re-engaged state. In this case, the flow of control goes on to a step S55 to set a quick-return flag F to suggest that the clutch be immediately put in an engaged state before finishing the processing. On the other hand, a difference (Ne−Neb) smaller than 50 rpm indicates that the normal control should be continued. In this case, the control of the rotational speed of the engine is completed without setting the quick-return flag F.

As described above, if the outcome of the judgment formed at the step S52 indicates that the shift change is a shift down, on the other hand, the flow of control continues to the step S53. At the step S53, the rotational speed Ne of the engine measured at the step S50 is compared with the rotational speed Ne1 of the engine stored at the step S12 in order to form a judgment as to whether or not the difference between the two (Ne−Ne1) is equal to or greater than 300 rpm. If the difference between the two (Ne−Ne1) is equal to or greater than 300 rpm, the flow of control continues to a step S54 at which the rotational speed Ne of the engine measured at the step S50 is compared with the peak-hold value Nep updated at the step S51 in order to form a judgment as to whether or not the difference between the two (Nep−Ne) is equal to or greater than 50 rpm.

This judgment is a judgment as to whether or not the driver has revved the engine in the shift-down operation. If the outcomes of the judgments formed at both the steps S53 and S54 are an acknowledgment (YES), the flow of control goes on to the step S55 to set a quick-return flag F to suggest that the clutch be immediately put in an engaged state before finishing the processing.

Figure 21:
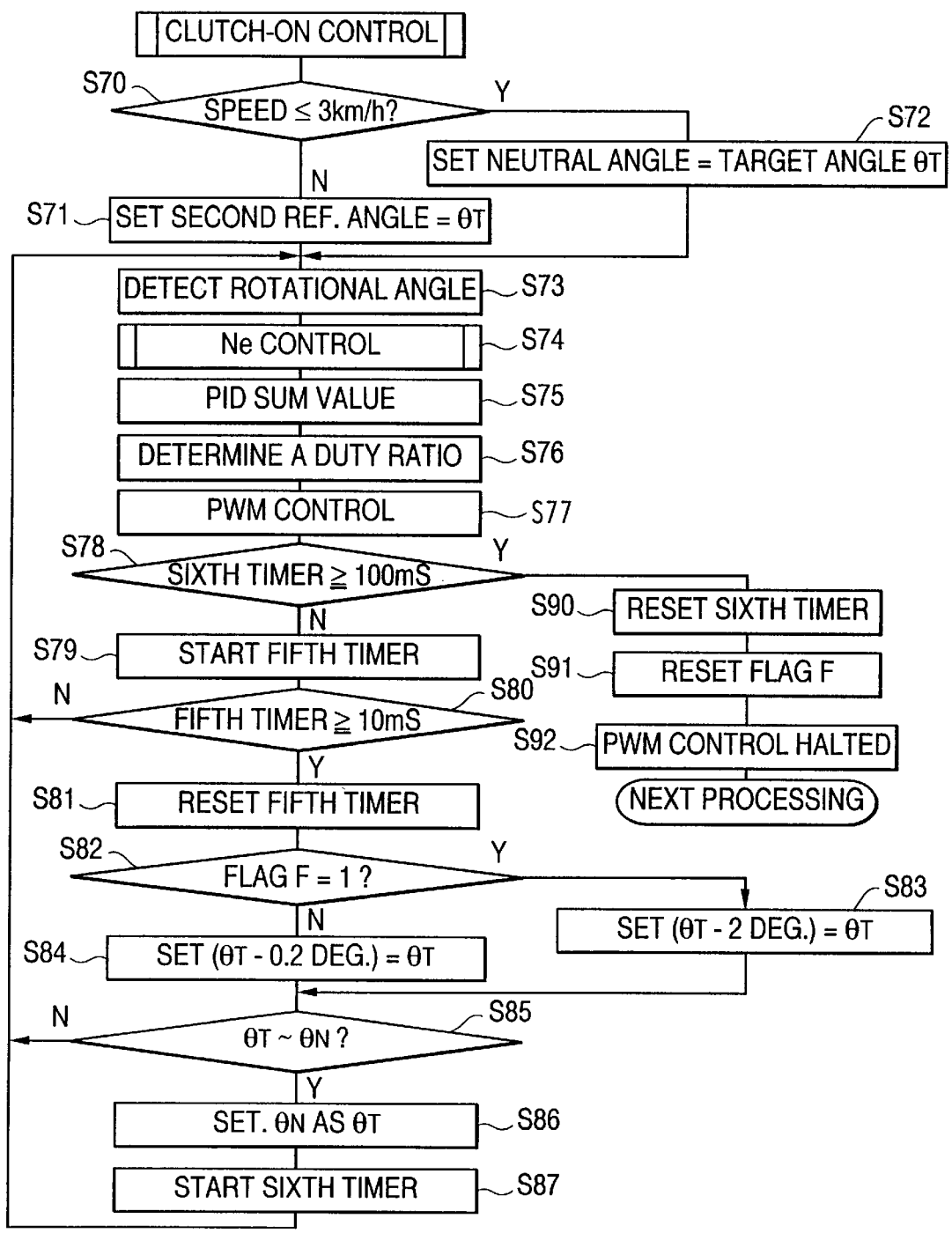
FIG. 21 is a diagram showing Part VI of a flowchart provided by the embodiment of the present invention.

FIG. 21 is a diagram showing a flowchart representing the method of the clutch-on control carried out at the steps S28 and S36.

As shown in the figure, the flowchart begins with a step S70 to form a judgment as to whether or not the speed of the vehicle is about zero. In the present embodiment, speeds of a vehicle up to 3 km/h are regarded as a vehicle speed of about zero. If the speed of the vehicle is about zero, the flow of control goes on to a step S72 at which a target angle $\theta_T$ of the shift spindle 3 is set at a neutral position. The flow of control then proceeds to a step S73. This flow of control is implemented to make a shift at the time the vehicle is in an all but halted state. In such a case, it is desirable to make a shift change quickly since no shift shock will be generated anyway.

If the outcome of the judgment formed at the step S70 indicates that the speed of the vehicle is equal to or greater than 3 km/h, on the other hand, the flow of control goes on to a step S71 at which the target angle $\theta_T$ of the shift spindle is set at a second reference angle, an angle differing from an angle, at which the rotation of the shift spindle 3 is halted by the stopper, by 6 degrees. Since the angle, at which the rotation of the shift spindle 3 is halted by the stopper, is +/−18 degrees in the present embodiment, the second reference angle is +/−12 degrees. The flow of control then continues to a step S73 at which the current rotational angle $\theta_T$ of the shift spindle 3 detected by the angle sensor 28 is input. Then, the flow of control goes on to a step S74 at which the Ne control is executed.

Subsequently, the flow of control proceeds to a step S75 at which a PID (Proportional, Integral and Differential) sum value for PID control is found. To put it in detail, a proportional (P) term, the integral (I) term and the differential (D) term are found and then added up. The P term is the difference ($\theta_0 - \theta_T$) between the current rotational angle $\theta_0$ detected at the step S73 and the target rotational angle $\theta_T$. The I and D terms are the integrated and differentiated values of the P term respectively. The flow of control then goes on to a step S76 at which the PID sum value is used for computing the duty ratio of the PWM control. Then, the flow of control proceeds to a step S77 at which the PWM control is executed.

Figure 25:
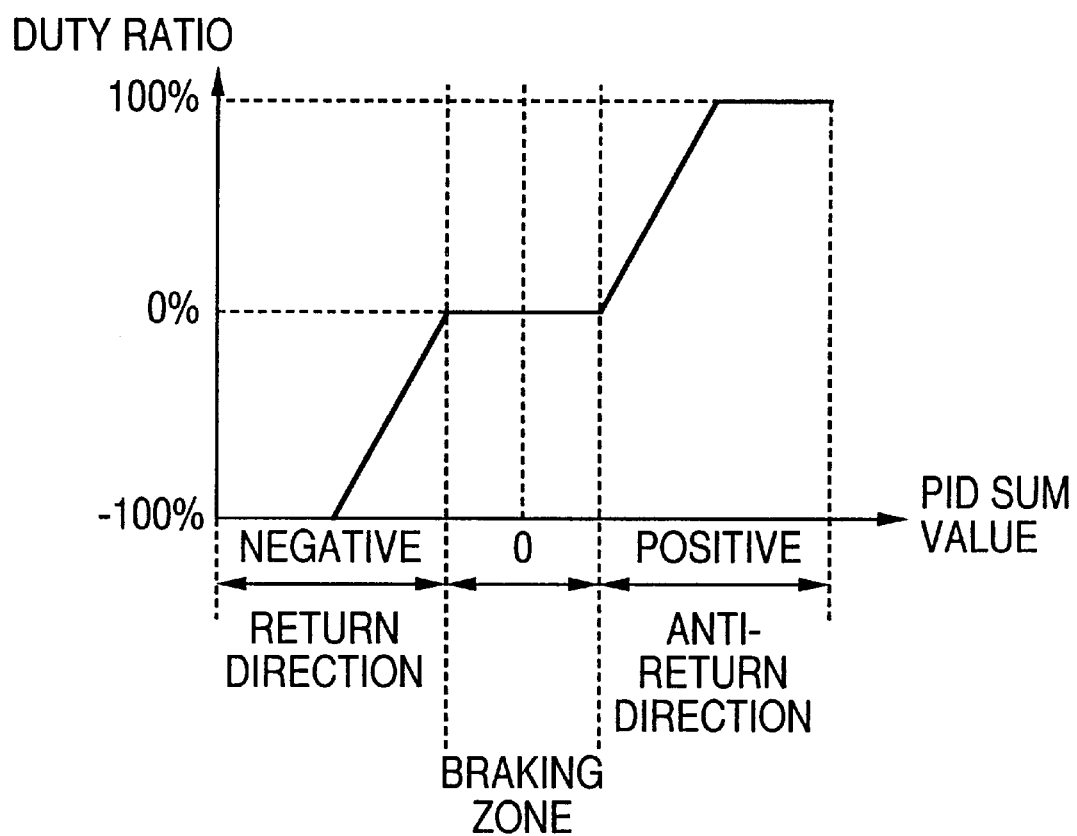
FIG. 25 is a diagram showing a relation between a PID (Proportional, Integral and Differential) sum value and a duty ratio.

FIG. 25 is a diagram showing a relation between a PID sum value and a duty ratio. As shown in the figure, a positive PID sum value gives a positive duty ratio while a negative PID sum value provides a negative duty ratio. The polarity of a duty ratio indicates a combination of FETs to be controlled by PWM. For example, a duty ratio of +50% means that the FETs (2) and (4) should be controlled by PWM at a duty ratio of 50%. On the other hand, a duty ratio of −50% means that the FETs (1) and (3) should be controlled by PWM at a duty ratio of 50%.

Subsequently, the flow of control goes on to a step S78 to form a judgment as to whether or not the time measured by a sixth timer has exceeded 100 ms. Since the sixth timer has not been started yet to measure time initially, the time should have not exceeded 100 ms, causing the flow of control to proceed to a step S79 at which a fifth timer is started to measure time. The flow of control then proceeds to a step S80 to form a judgment as to whether or not the time measured by a fifth timer has exceeded 10 ms. Initially, the time measured by the fifth timer should have not exceeded 10 ms, causing the flow of control to return to the step S73 to repeat the pieces of processing carried out at the steps S73 to S80.

As time goes by, the time measured by the fifth timer exceeds 10 ms at a point of time t5 of the time chart shown in FIG. 22. At that time, the flow of control goes on to a step S81 at which the fifth timer is reset. The flow of control then proceeds to a step S82 to form a judgment as to whether the quick-return flag F is in a set or reset state. If the quick-return flag F is in a set state, the flow of control continues to a step S83 to catalog a new target angle set at a value smaller than the present target angle by two to four degrees for use in the execution of quick-return control. If the quick-return flag F is in a reset state, on the other hand, the flow of control continues to a step S84 to catalog a new target angle set at a value smaller than the present target angle by 0.2 degrees.

The flow of control goes on from either the step S83 or S84 to a step S85 to form a judgment as to whether or not the target angle is close to a neutral angle. If the target angle is not close to the neutral angle, the flow of control returns to the step S73. The pieces of processing carried out at the steps S73 to S85 are repeated until the target angle becomes sufficiently close to the neutral angle. Later on, as the target angle is found sufficiently close to the neutral angle at the step S85, the flow of processing proceeds to a step S86 at which the neutral angle is cataloged as a target angle. The flow of control then continues to a step S87 at which the sixth timer starts to measure time.

If the outcome of the judgment formed at the step S78 indicates that the time measured by the sixth timer has exceeded 100 ms, on the other hand, the flow of control goes on to a step S90 at which the sixth timer is reset. The flow of control then proceeds to a step S91 at which the quick-return flag F is reset. Then, the flow of control continues to a step S92 at which the PWM control of the switching circuit 105 is terminated.

It should be noted that, if the gear is shifted from a neutral state at a high engine rotational speed in the course of a high-speed cruise, a relatively large engine brake works, imposing an excessively large load on the engine. In order to solve this problem, in the present embodiment, there is provided a shift disabling system for preventing the control shown in FIG. 16 from being executed at a vehicle speed equal to or higher than 10 km/h or an engine rotational speed equal to or higher than 3,000 rpm even if the shift-up switch 51 has been turned on.

Figure 11:
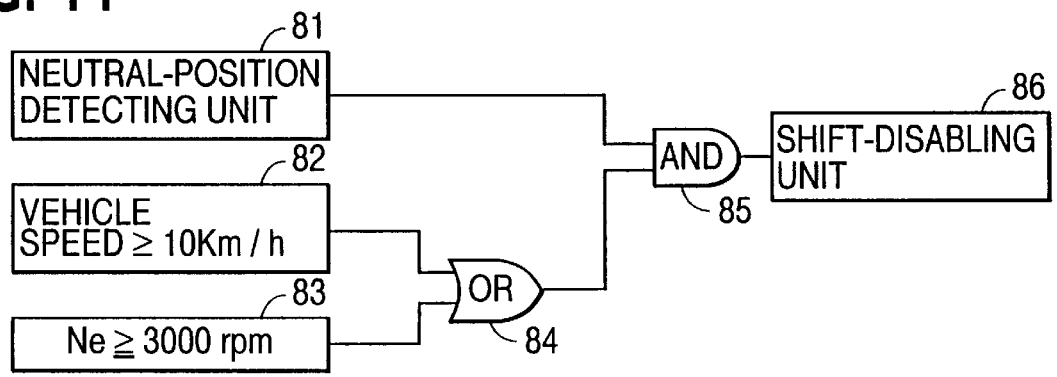
FIG. 11 is a functional block diagram showing a shift disabling system.

FIG. 11 is a functional block diagram showing the shift disabling system. As shown in the figure, the shift disabling system employs a neutral-position detecting unit 81 for outputting an "H"-level signal to indicate that the gear is placed at a neutral position. A vehicle-speed judging unit 82 generates an "H"-level signal for a speed of the vehicle equal to or higher than 10 km/h. On the other hand, an engine-rotational-speed judging means 83 generates an "H"-level signal for a rotational speed of the engine equal to or higher than 3,000 rpm.

An OR circuit 84 generates an "H"-level signal the vehicle-speed judging unit 82 generates an "H" signal or the engine-rotational-speed judging me generates an "H"-level signal. On the other hand, circuit 85 generates an "H"-level signal when the neutral-position detecting unit 81 generates an "H"-level signal and the OR circuit 84 generates an "H"-level signal. With the AND circuit 85 outputting the "H"-level signal, the shift disabling system prevents the control shown in FIG. 16 from being executed even if the shift-up switch 51 has been turned on.

If a shift change is made to a neutral state by mistake at a vehicle speed equal to or higher than 10 km/h or an engine rotational speed equal to or higher than 3,000 rpm in the course of acceleration from the first speed, however, it takes time to accomplish re-acceleration. Thus, a system for disabling a shift to a neutral state in the course of a vehicle cruise, for example, at a vehicle speed equal to or higher than 3 km/h can be further added besides the shift disabling system described above.

According to the present invention, since a shift change is disabled if the speed of the vehicle or the rotational speed of the engine and a shift position of the gear satisfy conditions for disabling a shift change in spite of the fact that a shift switch has been turned on, the problem caused by an incorrect operation of the shift switch can be avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A shift control unit for an electric-power-assist transmission, the electric-power-assist transmission including a shift spindle rotated by a driving motor, an angle sensor for detecting a rotational position of said shift spindle, a transmission mechanism for putting a main clutch in an engaged or disengaged state in a manner which is mechanically coupled with rotation of said shift spindle; and a gear shifting mechanism for switching a gear in a manner which is mechanically coupled with said rotation of said shift spindle, said shift control unit comprising:

an engine-rotational-speed sensor for sensing a rotational speed of an engine;

a position sensor for sensing a position of said shift spindle; and shift disabling means which is used for disabling a shift change without regard to a shift instruction if the speed of a vehicle is equal to or greater than a predetermined value or the rotational speed of said engine is equal to or greater than another predetermined value and, at the same time, while said position sensor is indicating a neutral position.

2. The shift control unit for an electric-power-assist-type transmission according to claim 1, wherein in the course of a vehicle cruise, a shift down to a neutral position is disabled.

3. An electric power-assist transmission comprising:
a main clutch;
a shift spindle;
a driving motor for rotating said shift spindle;
an angle sensor for detecting a rotational position of said shift spindle;
a transmission mechanism for putting said main clutch in an engaged or disengaged state while coupled with rotation of said shift spindle;
a gear shifting mechanism for switching a gear while coupled with said rotation of said shift spindle; and
a shift control unit including:
   a vehicle speed sensor for sensing a speed of a vehicle having said transmission;
   an engine rotational speed sensor for sensing a rotational speed of an engine driving said transmission;
   a position sensor for sensing a position of said shift spindle; and
   shift disabling means for disabling a shift change without regard to a shift instruction if the speed of said vehicle is equal to or greater than a first value or the rotational speed of said engine is equal to or greater than a second value while said gear mechanism is in a neutral position.

4. The electric power-assist transmission according to claim 3, further comprising means connected with said vehicle speed sensor for generating a hi-level signal when the speed of the vehicle is equal to or higher than 10 km/h.

5. The electric power-assist transmission according to claim 3, further comprising means connected with said rotational speed sensor for generating a hi-level level signal when the rotational speed of said engine is equal to or greater than 3,000 rpm.

6. The electric power-assist transmission according to claim 3, further comprising means connected with said position sensor for generating a hi-level signal when the gear mechanism is in a neutral position.

7. The electric power-assist transmission according to claim 4, further comprising means connected with said rotational speed sensor for generating a hi-level signal when the rotational speed of said engine is equal to or greater than 3,000 rpm.

8. The electric power-assist transmission according to claim 7, further comprising means connected with said position sensor for generating a hi-level signal when the gear mechanism is in a neutral position.

9. The electric power-assist transmission according to claim 8, further comprising an OR circuit for generating a hi-level signal when the means connected with said vehicle speed sensor generates a hi-level signal or the means connected with said rotational speed sensor generates a hi-level signal.

10. The electric power-assist transmission according to claim 9, further comprising an AND circuit for generating a hi-level signal when the means connected with said position sensor generates a hi-level signal and the OR circuit also generates a hi-level signal.

11. In combination, a shift control unit and an electric-power-assist transmission, said electric-power-assist transmission including a main clutch, a shift spindle, a driving motor for rotating said shift spindle, an angle sensor for detecting a rotational position of said shift spindle, a transmission mechanism for putting said main clutch in an engaged or disengaged state in a manner which is mechanically coupled with rotation of said shift spindle, and a gear shifting mechanism for switching a gear in a manner which is mechanically coupled with said rotation of said shift spindle, said shift control unit comprising:

a vehicle speed sensor for sensing a speed of a vehicle having said transmission;

means connected with said vehicle speed sensor for generating a hi-level signal when the speed of the vehicle is equal to or higher than a first value;

an engine rotational speed sensor for sensing a rotational speed of an engine driving said transmission;

means connected with said rotational speed sensor for generating a hi-level signal when the rotational speed of said engine is equal to or greater than a second value;

a position sensor for sensing a position of said shift spindle;

means connected with said position sensor for generating a hi-level signal when the gear mechanism is in a neutral position;

an OR circuit for generating a hi-level signal when the means connected with said vehicle speed sensor generates a hi-level signal or the means connected with said rotational speed sensor generates a hi-level signal;

an AND circuit for generating a hi-level signal when the means connected with said position sensor generates a hi-level signal and the OR circuit also generates a hi-level signal; and shift disabling means for disabling a shift change without regard to a shift instruction when said AND circuit generates a hi-level signal.

12. The shift control unit according to claim 11, wherein said first value is 10 km/h.

13. The shift control unit according to claim 11, wherein said second value is 3,000 rpm.

* * * * *